2,839,553

POLYHALOGENO BICYCLIC ACIDS

Samuel B. Soloway, Denver, Colo., assignor to Shell Development Company, New York, N. Y., a corporation of Delaware No Drawing. Application March 14, 1955
Serial No. 494,277

8 Claims. (Cl. 260—429.9)

This invention pertains to a novel series or group of carboxylic acids and to salts thereof. More particularly, the invention pertains to a novel class of substituted aliphatic acids having substituted directly on carbon thereof a substituted bicyclic nucleus composed of two fused pentatomic rings at least one of which comprises an ethylenic bond and having a plurality of halogens substituted on the bicyclic structure. The invention further provides methods for the preparation of the members of this novel series of acids.

In one of its novel aspects the invention pertains to carboxylic acids having structures represented by the chemical formula

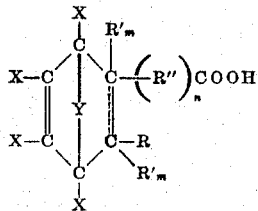

in which each X represents an atom of a halogen, Y represents an alkylidene or halogen-substituted alkylidene group, each R and R' represent the hydrogen atom or a hydrocarbon group, R" represents a divalent aliphatic radical, one valency of which is satisfied by attachment to the polycyclic structure depicted in the formula and the other valency of which is satisfied by attachment to the carboxyl group depicted in the formula, $n$ represents 0 or 1, and each $m$ represents 0 or 1 with the proviso that both $m$'s have the same value. Where $m$ represents 1, the bond between the two ring carbon atoms substituted by R' is of course a single bond; where $m$ represents 0 this bond is a double bond.

In another novel aspect the invention pertain to new and useful salts of these acids, especially to salts thereof with nitrogen bases and hydroxide-forming metals.

In another novel aspect the invention pertains to new and useful substituted acids of the fatty acid series having substituted directly on carbon thereof a halogen-substituted bicyclo(2.2.1)-5-hepten-2-yl radical composed solely of atoms of carbon, hydrogen and halogen and containing a plurality of atoms of halogen substituted on carbon of the unsaturated pentatomic ring. In one of the preferred aspects of the invention the substituted acid of the fatty acid series is a saturated fatty acid, that is to say, formic acid, acetic acid, propionic acid or a higher straight-chain or branched-chain homolog thereof. In another and preferred aspect of the invention the substituted acid of the fatty acid series is an unsaturated, preferably an alpha,beta-ethylenically unsaturated, acid, such as acrylic acid, methacrylic acid, or homolog thereof.

The invention provides in particular a novel series of substituted aliphatic acids having substituted directly on carbon thereof a polyhalogeno-substituted bicyclo(2.2.1)-5-hepten-2-yl radical, the sole constituent atoms of which are carbon, hydrogen and halogen, and wherein the polyhalogen-substituted bicyclo(2.2.1)-5-hepten-2-yl radical preferably contains from 4 to 6 atoms of halogen substituted on carbon of the unsaturated pentatomic ring. With regard to certain fields of utility, the substituted $C_1$ to $C_4$ fatty acids having a polyhalogeno-substituted bicyclo(2.2.1)-5-hepten-2-yl radical substituted directly on carbon thereof have been found to be especially valuable. For example, the members of this more limited group have been found to be of outstanding utility for certain agricultural purposes, especially for use as herbicides and defoliants. The invention, however, is in on sense restricted to this preferred group and the higher fatty acids containing, for example, from 5 to 30 carbon atoms and substituted by such a polyhalogeno bicycloheptenyl group are also provided by the invention.

As salts of these novel acids, the invention provides the salts with nitrogen bases, such as ammonia, aliphatic amines, aromatic amines, heterocyclic amines and hydrazine and its substitution products, as well as the salts with the hydroxide-forming metals. Among the readily prepared novel salts of the invention are the salts of the foregoing acids with the alkalinous metals, that is to say, the alkali metals and the alkaline earth metals, and also the salts with amphoteric metals, such as aluminum, zinc, copper, iron, tin and the like.

The novel acids and salts thereof provided by this invention include new products which have been found to have outstanding utility for agricultural purposes, e. g. as defoliants, herbicides, and in like applications wherein they apparently exert a hormone-like function in the metabolism of the plant. The utility of the novel products of this invention is not restricted, however, to agricultural purposes. The acids themselves, for example, can be employed as modifying agents for alkyd resins to impart the desired characteristics of flame resistance, weatherability, and ductility to the alkyd resins. For example, a conventional phthalic anhydride-glycerol alkyd can be usefully modified by cooking in a small amount of one or more of the novel acids of this invention. The incorporation of the modifying acid may be effected concurrently with the initial reaction between the phthalic anhydride and the glycerol or it may be by means of a separate step. Esters of the novel acids of this invention are useful as plasticizers, for example, for polyvinyl chloride or like high molecular weight plastics. The salts of this invention are useful as plant regulators and for other agricultural purposes and also as modifying agents for resins, surface coatings, and the like.

As a general class, the novel acids of this invention can be prepared by reacting polyhalogeno-substituted cyclopentadiene hydrocarbons with unsaturated acids containing ethylenic or acetylenic unsaturation between two carbon atoms that form part of a linear carbon chain to which the carboxyl group is bonded. The reaction, which in certain respects is analogous to the well-known Diels-Alder diene synthesis, leads to joinder of the polyhalogeno cyclopentadiene ring system to the said ethylenic or acetylenic unsaturated linkage with generation of the polyhalogeno bicycloheptenyl structure that in part characterizes the novel acids of this invention. In certain cases, however, the novel acids, alternatively may be synthesized by a less direct procedure. For example, instead of reacting the polyhalogeno-substituted cyclopentadiene hydrocarbon with an ethylenically or acetylenically unsaturated acid as such, there may be employed for the adduction a derivative that is hydrolyzable to the acid, such as a nitrile, an ester, an amide or an acid halide. The adduct of the polyhalogeno-substituted cyclopentadiene hydrocarbon and such derivative, which adduct will contain the hydrolyzable functional group that is characteristic of the derivative, then can be hydrolyzed or saponified to generate the corresponding acid that is desired in accordance with the invention. Correspondingly, in appropriate cases the salts can be generated directly by treatment of such functional derivatives with appropriate basic agents. For the preparation of the novel acids of the invention wherein a polyhalogeno-substituted bicycloheptenyl group is substituted directly on the beta carbon atom of an alpha,beta-ethylenically unsaturated acid of the fatty acid series, a preferred method of synthesis comprises reacting a polyhalogeno-substituted cyclopentadiene hydrocarbon with an alpha,beta-ethylenically unsaturated aldehyde, such as acrolein or methacrolein, to yield a polyhalogenobicyclo(2.2.1)-5-heptene-2-carboxaldehyde which in turn may be converted to the desired beta-(polyhalogeno bicycloheptenyl)-alpha,beta-ethylenically unsaturated acid by reaction with malonic acid according to the Doebner modification of the Knoevenagel condensation.

The following examples are presented to illustrate certain of the novel products of the invention and methods suitable for their preparation. It will be appreciated, of course, that the invention is not restricted to the specific embodiments that are shown in the examples.

EXAMPLE I.—1,4,5,6,7,7-HEXACHLOROBICYCLO-(2.2.1)-5-HEPTENE-2-CARBOXYLIC ACID

In this example there is illustrated the preparation of 1,4,5,6,7,7-hexachlorobicyclo(2.2.1)-5-heptene-2-carboxylic acid by reaction of hexachlorocyclopentadiene with acrylic acid. Two hundred seventy-three grams (1 mole) of hexachlorocyclopentadiene was dissolved in 150 ml. acetic acid and the solution was heated with stirring to about 120° C. While the temperature was maintained at about 120° C. there was added dropwise over a period of about one hour 87 grams (1.2 moles) of acrylic acid. The mixture then was refluxed (about 124° C.) for 7½ hours at which time the product was thrown down by dilution of the mixture with water. There was collected 340 grams of crude product which after drying in a vacuum oven overnight melted at about 140–45° C. Fractional recrystallization of the crude product from diethyl ether-hexane mixture yielded 210 grams of purified product, melting point 181–182.5° C., along with 111 grams of less highly purified product, representing a total yield of 93% of theory. The fraction melting at 181–182.5° C. was analyzed with the following results: 61.5% chlorine found and neutralization equivalent of 348 found. Calculated for 1,4,5,6,7,7-hexachlorobicyclo(2.2.1)-5-heptene-2-carboxylic acid, 61.5% chlorine and neutralization equivalent 345. The structure of this acid can be represented in planar form by the following chemical formula:

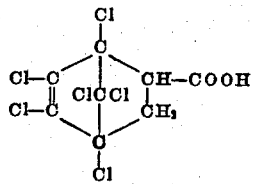

EXAMPLE II.—1,4,5,6,7,7-HEXACHLOROBICYCLO-(2.2.1)-5-HEPTENE-2-CARBOXYLIC ACID

In this example there is is illustrated an indirect synthesis of 1,4,5,6,7,7-hexachlorobicyclo(2.2.1)-5-heptene-2-carboxylic acid by reaction of hexachlorocyclopentadiene with methyl acrylate to yield methyl 1,4,5,6,7,7-hexachlorobicyclo(2.2.1)-5-heptene-2-carboxylate and saponification of this ester to yield the desired acid. There were mixed in a flask equipped with mechanical stirrer, condenser and thermometer, 136.5 grams (0.5 mole) of hexachlorocyclopentadiene and 43 grams (0.5 mole) of methyl acrylate containing a small amount of hydroquinone as a polymerization inhibitor. The mixture then was heated with stirring progressively to 80–85° C. for 45 minutes, to 100° C. for two hours, to 125–30° C. for two hours, and finally at 180° C. for one-half hour. The mixture then was cooled and the crude product was precipitated by dilution with hexane. A further amount of crude product was recovered by concentrating and chilling the separated mother liquor. The combined crude product, representing a yield 87% of theory, was recrystallized successively from hexane, n-heptane and methanol to yield the purified methyl 1,4,5,6,7,7-hexachlorobicyclo(2.2.1)-5-heptene-2-carboxylate, melting point 57–60° C.

This product was dissolved in an approximately equal amount of a mixture of 700 parts by volume of isopropyl alcohol and 280 parts by volume of water. While the solution was maintained at reflux there was slowly added a slight stoichiometric excess of 20% aqueous sodium hydroxide solution at such a rate that the refluxing solution remained slightly alkaline to phenolphthalein. The crude 1,4,5,6,7,7-hexachlorobicyclo(2.2.1)-5-heptene-2-carboxylic acid was sprung by addition of 6 N $H_2SO_4$. The resulting solid was removed by filtration and recrystallized from benzene to yield the purified 1,4,5,6,7,7-hexachlorobicyclo(2.2.1)-5-heptene-2-carboxylic acid, melting at about 178° C.

EXAMPLE III.—1,4,5,6,7,7-HEXACHLOROBICYCLO (2.2.1)-HEPTENE-2-PELARGONIC ACID

In this example 1,4,5,6,7,7-hexachlorobicyclo(2.2.1)-5-heptene-2-pelargonic acid was prepared by direct reaction of hexachlorocyclopentadiene with 10-undecenoic acid. There were mixed in a flask equipped with a reflux condenser, 92 grams (0.5 mole) of 10-undecenoic acid and 136.5 grams (0.5 mole) of hexachlorocyclopentadiene. The mixture was heated at 115° C. for about 15 hours by which time it had acquired a viscous consistency and had darkened in color. Low-boiling materials then were removed from it by evaporation up to 170° C. under 0.3 millimeter mercury pressure. The remaining 187 grams of dark, viscous, oily liquid then was distilled in a molecular still to yield 137 grams of distillate boiling at 204–208° C. under $8 \times 10^{-4}$ millimeters mercury pressure. A portion of this first distillate was redistilled to yield 38.5 grams of redistilled 1,4,5,6,7,7-hexachlorobicyclo (2.2.1)-5-heptene-2-pelargonic acid distilling at 186–188° C. under $8 \times 10^{-4}$ millimeters mercury pressure. Analyses: found, 42.8% C, 4.6% H, 46.3% Cl; calculated for $C_{16}H_{20}Cl_6O_2$, 42.1% C, 4.37% H, 46.6% Cl. Refractive index ($n$ 23/D) 1.5266. The chemical structure of this product is shown in planar form by the following formula:

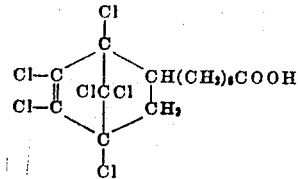

EXAMPLE IV.—1,4,5,6-TETRACHLOROBICYCLO (2.2.1)-5-HEPTENE-2-CARBOXYLIC ACID

This example illustrates the preparation of 1,4,5,6-tetrachlorobicyclo(2.2.1)-5-heptene-2-carboxylic acid by reaction between 1,2,3,4-tetrachloro-1,3-cyclopentadiene and acrylic acid. There were mixed 102 grams of 1,2,3,4-tetrachloro-1,3-cyclopentadiene and an equimolar amount of acrylic acid containing a small amount of methylene blue as polymerization inhibitor. The mixture was gently warmed until the mildly exothermic reaction commenced after which the temperature was allowed to rise spontaneously to about 65° C. over 1½ hours. After an additional one-half hour at 55–65° C. the mixture was cooled. The resulting crude product, which was a solid at room temperature, was dissolved in diethyl ether and the solution was decolorized with activated carbon, concentrated by evaporation and cooled. The resulting crystallized product was recrystallized from diethyl ether to yield 45.1 grams of recrystallized 1,4,5,6-tetrachlorobicyclo(2.2.1)-5-heptene-2-carboxylic acid, melting point 157–8° C. Additional amounts of the product were recovered by evaporating the mother liquors and fractionally crystallizing the residue successively from hexane, hexane-ether, carbon tetrachloride and nitromethane, yielding a total amount of 1,4,5,6-tetrachlorobicyclo-(2.2.1)-5-heptene-2-carboxylic acid, melting point 157–8° C., equal to a 43.4% yield. The product was found to have a neutralization equivalent of 280 compared to the calculated value of 276. The structure of this product is described by the following planar formula:

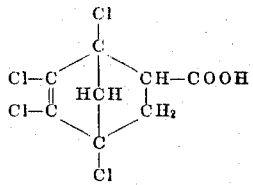

EXAMPLE V.—1,4,5,6,7,7-HEXACHLOROBICYCLO (2.2.1)-2,5-HEPTADIENE-2-CARBOXYLIC ACID

In this example there is illustrated the products of the invention wherein the polyhalogenated bicyclic structure contains two ethylenic nuclear unsaturated linkages. There also is illustrated by the example a method of synthesis whereby these products are prepared by reaction of a hexahalocyclopentadiene with a hydrolyzable derivative of an acetylenically unsaturated acid and hydrolysis of the resulting adduct. There were mixed 54.6 grams (0.2 mole) of hexachloro-1,3-cyclopentadiene and an equimolar amount of ethyl propiolate and the mixture was heated at about 112° C. for 36 hours. Distillation of the resulting mixture led to recovery of 50.9 grams of ethyl 1,4,5,6,7,7-hexachlorobicyclo(2.2.1)-2,5-heptadiene-2-carboxylate which distilled at 117–126° C. under 0.5 millimeter mercury pressure as a yellow liquid that upon cooling changed to a white solid, melting point 41–4° C. The ethyl 1,4,5,6,7,7 - hexachlorobicyclo(2.2.1) - 2,5-heptadiene-2-carboxylate was dissolved in acetic acid, 50 ml. of concentrated sulfuric acid and 15 ml. of water were added to the solution and the mixture was heated to 75° C. for 24 hours. The resulting mixture was poured over cracked ice, the oily product was recovered by extraction with diethyl ether and the resulting solution was washed with water and then extracted with sodium bicarbonate solution to separate out the 1,4,5,6,7,7-hexachlorobicyclo-(2.2.1)-2,5-heptadiene-2-carboxylic acid as a solution of the sodium salt. This solution was purified by washing with ether and then acidified to liberate the free acid. The separated acid was crystallized from ethyl acetate-hexane mixture, yielding the purified product as a white crystalline solid melting at 205–10° C. with decomposition. Analyses: found, 28.2% C, 0.88% H, neutralization equivalent 348; calculated for $C_8H_2Cl_6O_2$, 28.0% C, 0.58% H, neutralization equivalent 343. The structure of this product is represented by the following planar formula:

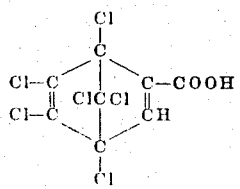

An alternative synthesis of this product would be by direct reaction of hexachlorocyclopentadiene with propiolic acid.

EXAMPLE VI.—1,4,5,6,7,7-HEXACHLOROBICYCLO (2.2.1)-5-HEPTENE-2-ACETIC ACID

In this example there is illustrated the preparation of 1,4,5,6,7,7-hexachlorobicyclo(2.2.1) - 5 - heptene-2-acetic acid by reaction of hexachlorocyclopentadiene with vinylacetic acid. The reaction was carried out by mixing 41.1 grams (0.478 mole) of vinylacetic acid and 101 grams (0.378 mole) of hexachloro-1,3-cyclopentadiene and heating the mixture at 145° C. for 24 hours. The resulting product was dissolved in diethyl ether and the solution was extracted with three 150-ml. portions of sodium carbonate solution. The extracts were combined, acidified, extracted with ether and the extract was washed with water and dried over anhydrous $Na_2SO_4$. Distillation of the washed and dried extract yielded 106 grams of crude product distilling at 164–9° C. under 0.9 millimeter mercury pressure and collecting in the receiver as a heavy oil mixed with crystals. This was triturated with pentane to leave 100.2 grams of 1,4,5,6,7,7-hexachlorobicyclo-(2.2.1)-5-heptene-2-acetic acid, melting point 119–23° C. The structure of this product is as follows:

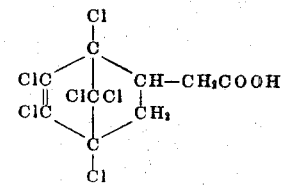

EXAMPLE VII.—1,4,5,6,7,7-HEXACHLOROBICYCLO(2.2.1)-5-HEPTENE-2-ACETIC ACID

In this example there is illustrated a procedure for preparation of the product shown in Example VI by reaction of hexachloro-1,3-cyclopentadiene with 3-butenenitrile followed by hydrolysis of the resulting 1,4,5,6,7,7-hexachlorobicyclo(2.2.1)-5-heptene-2-acetonitrile to obtain the desired product.

*a. Preparation of 1,4,5,6,7,7-hexachlorobicyclo(2.2.1)-5-heptene-2-acetonitrile*

In a five-liter flask equipped with thermometer, mechanical stirrer and reflux condenser there were mixed 3360 grams (12.3 moles) of hexachloro-1,3-cyclopentadiene and 838 grams (12.5 moles) of allyl cyanide. The mixture was heated to 117° C. and held at this temperature for about 36 hours. The reflux condenser then was replaced by a short fractionating column and unconsumed hexachlorocyclopentadiene and allyl cyanide were distilled overhead. The remaining crude reaction product was dissolved in diethyl ether and the solution was washed with water and dried over anhydrous $Na_2SO_4$. The washed and dried solution was decolorized and fractionally distilled to yield 1,4,5,6,7,7-hexachlorobicyclo(2.2.1)-5-heptene-2-acetonitrile as a light-colored oil distilling at 120–2° C. under 0.8 millimeter mercury pressure. Upon cooling to room temperature the nitrile solidified.

*b. Preparation of 1,4,5,6,7,7-hexachlorobicyclo(2.2.1)-5-heptene-2-acetic acid*

To a mixture of 1450 grams (4.25 moles) of 1,4,5,-6,7,7-hexachlorobicyclo(2.2.1)-5-heptene - 2 - acetonitrile there was added 500 ml. of water. To this mixture in a five-liter flask equipped with reflux condenser and mechanical stirrer there was added dropwise with vigorous stirring over a period of two hours 1000 ml. of concentrated sulfuric acid. After all of the sulfuric acid had been added the mixture was heated at 140° C. overnight. The resulting mixture was poured over cracked ice and the water-insoluble, tacky, semi-solid product which separated was dissolved in diethyl ether. The ether solution was extracted with a slight excess of aqueous NaOH solution and the extract then was washed with diethyl ether and acidified. The precipitated crude 1,4,5,6,7,7-hexachlorobicyclo(2.2.1)-5-heptene - 2 - acetic acid was taken up in ether and the acid was precipitated by dilution with pentane to yield a white waxy solid melting at 88–102° C. This was recrystallized from hexane to give 655 grams of white, small, rhomboidal crystals melting at 121.5–123° C. The purified 1,4,5,6,7,7-hexachlorobicyclo(2.2.1)-5-heptene-2-acetic acid was found to contain 59.1% chlorine and to have a neutralization equivalent of 355 compared to a calculated chlorine content of 59.3% for the formula $C_9H_8Cl_6O_2$ and a calculated neutralization equivalent of 359.

EXAMPLE VIII.—1, 4, 5, 6, 7, 7 - HEXACHLORO-3-METHYLBICYCLO(2.2.1)-5-HEPTENE - 2 - CARBOXYLIC ACID

This example illustrates the direct preparation of 1,4,5,6,7,7-hexachloro - 3 - methylbicyclo(2.2.1)-5-heptene-2-carboxylic acid by reaction of hexachloro-1,3-cyclopentadiene and crotonic acid. There were mixed in a 500 ml. flask equipped with thermometer and reflux condenser 273 grams of hexachloro-1,3-cyclopentadiene and 86 grams of crotonic acid. One hundred fifty milliliters of xylene were added and the resulting mixture was refluxed overnight (temperature about 150° C.). After removal of unconsumed reactants and xylene by distillation to a kettle temperature of 160° C. under 18 millimeters mercury pressure the remaining residue was precipitated from a decolorized solution in ethyl acetate by dilution with hexane and the resulting crystals were recrystallized from a saturated solution in ethyl acetate. There were obtained 72 grams of white plate-like crystals melting at 171–2° C.

Analyses.—Found, 30.4% C, 1.8% H, neutralization equivalent 354; calculated, 30.1% C, 1.67% H, neutralization equivalent 359. The structure of 1,4,5,6,7,7-hexachloro-3-methylbicyclo(2.2.1)-5-heptene - 2 - carboxylic acid can be represented by the following formula:

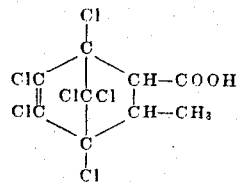

EXAMPLE IX.—1, 4, 5, 6, 7, 7 - HEXACHLOROBICYCLO(2.2.1)-5-HEPTENE-2-ACRYLIC ACID

This example illustrates the preparation of unsaturated acids of the invention by reaction of a polyhalogeno-substituted bicycloheptenyl aldehyde with malonic acid according to the Doebner synthesis.

a. Preparation of 1,4,5,6,7,7-hexachlorobicyclo(2.2.1)-5-heptene-2-carboxaldehyde There were mixed 409.5 grams of hexachloro-1,3-cyclopentadiene (1.5 moles) and 112 grams of acrolein (2.0 moles) and the mixture was heated at reflux. After about 20 hours of heating the mixture contained copious amounts of yellow crystalline solid. The mixture was heated for an additional 24 hours and then cooled and unconsumed acrolein and hexachloro-1,3-cyclopentadiene were removed by distillation in vacuo. 1,4,5,6,7,7-hexachlorobicyclo(2.2.1)-5-heptene-2-carboxaldehyde was recovered from the remaining black residue by sublimation at 175° C. and 1.0 millimeter mercury pressure to recover 413 grams of product as a pale yellow, waxy, crystalline solid, melting point approximately 145–8° C.

b. Preparation of 1,4,5,6,7,7-hexachlorobicyclo(2.2.1)-5-heptene-2-acrylic acid 108.5 grams of the 1, 4, 5, 6, 7, 7-hexachlorobicyclo-(2.2.1)-5-heptene-2-carboxaldehyde was dissolved in 150 ml. of pyridine and 68.8 grams of malonic acid and 50 ml. of additional pyridine were added. The reaction mixture then was heated to 60° C. for 18 hours when evolution of carbon dioxide had ceased. Pyridine was removed by evaporation in vacuo and the residue was poured into 3 N HCl. The 1,4,5,6,7,7-hexachlorobicyclo-(2.2.1)-5-heptene-2-acrylic acid was recovered by extracting with ether, washing with water and drying, evaporating the ether and crystallizing from benzene-hexane mixture and then recrystallizing from aqueous methanol. The recrystallized 1,4,5,6,7,7-hexachlorobicyclo(2.2.1)-5-heptene-2-acrylic acid was found to melt at 120.5–1.5° C.

Analyses.—Found, 32.2% C, 1.43% H, 57.4% Cl, neutralization equivalent, 376; calculated, 32.35% C. 1.62% H, 57.4% Cl, neutralization equivalent, 371.

The structure of this product is represented by the following planar formula:

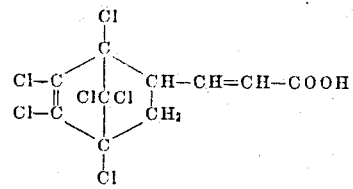

EXAMPLE X.—1, 4, 5, 6, 7, 7 - HEXACHLOROBICYCLO(2.2.1)-5-HEPTENE-2-PROPIONIC ACID

In this example 1,4,5,6,7,7-hexachlorobicyclo(2.2.1)-5-heptene-2-propionic acid was prepared by hydrogenation of the 1,4,5,6,7,7-hexachlorobicyclo(2.2.1)-5-heptene-2-acrylic acid that is illustrated by the preceding example. In lieu of this indirect synthesis 1,4,5,6,7,7-hexachlorobicyclo(2.2.1)-5-heptene-2-propionic acid also can be prepared directly by reaction of hexachloro-1,3-cyclopentadiene with 4-pentenoic acid. In the present example 50 grams of 1,4,5,6,7,7-hexachlorobicyclo(2.2.1)-5-heptene-2-acrylic acid dissolved in 150 ml. of acetic acid was hydrogenated at about 45° C. and 40–50 p. s. i. hydrogen using platinum oxide as the catalyst. The resulting solution was decolorized with active charcoal and the filtrate was concentrated under reduced pressure to a pale yellow, oily residue. The oil was taken up in ether and the solution was washed and dried. The residue remaining after evaporation of the ether was crystallized by cooling to yield 49 grams of small prismatic crystals which upon recrystallization from hexane-pentane mixture melted at 84–84.5° C. Yield, 94.5% of theory.

Analyses.—Found, 32.3% C, 2.41% H, 56.4% Cl; calculated for $C_{10}H_8Cl_6O_2$, 32.0% C, 2.67% H, 56.7% Cl.

The structure of 1,4,5,6,7,7-hexachlorobicyclo(2.2.1)-5-heptene-2-propionic acid can be represented in planar form by the following formula:

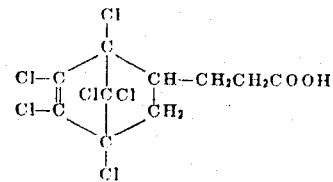

EXAMPLE XI.—1,4,5,6-TETRACHLOROBICYCLO-(2.2.1)-5-HEPTENE-2-ACRYLIC ACID a. Preparation of 1,4,5,6-tetrachlorobicyclo(2.2.1)-5-heptene -2-carboxaldehyde Using the method illustrated in Example IX, 1,2,3,4-tetrachloro-1,3-cyclopentadiene was condensed with acrolein to produce the 1:1 adduct, 1,4,5,6-tetrachlorobicyclo-(2.2.1)-5-heptene-2-carboxaldehyde. Boiling point 90–1° C. under 0.5 millimeter mercury pressure; refractive index (n 24/D) 1.5436.

b. Preparation of 1,4,5,6-tetrachlorobicyclo(2.2.1)-5-heptene-2-acrylic acid

There were mixed 52 grams of 1,4,5,6-tetrachlorobicyclo(2.2.1)-5-heptene-2-carboxaldehyde and 41.6 grams of malonic acid. To the mixture there were added 200 ml. of pyridine and 1 ml. of piperidine and the resulting mixture was heated at from 60° C. up to 100° C. until evolution of carbon dioxide ceased. The pyridine then was distilled off and the residue poured into 3 N HCl solution. The oily layer which separated was dissolved in ether and the solution was washed, dried over sodium sulfate, and the ether was evaporated. The residue, which crystallized upon standing, was recrystallized from ethyl acetate-hexane mixture to yield 55 grams of crystalline 1,4,5,6-tetrachlorobicyclo(2.2.1)-5-heptene-2-acrylic acid melting at 120–122° C. Yield, 86% of theory.

EXAMPLE XII.—1, 4, 5, 6, 7, 7 - HEXACHLOROBI-CYCLO(2.2.1)-5-HEPTENE-2-(ALPHA,BETA - DI-CHLOROPROPIONIC ACID)

1,4,5,6,7,7-hexachlorobicyclo(2.2.1)-5-heptene - 2 - a-crylic acid, prepared as in Example IX, was chlorinated in $CCl_4$ solution by reaction with chlorine gas. The chlorinated solution then was partially evaporated and allowed to stand overnight, yielding 1,4,5,6,7,7-hexachloro-bicyclo(2.2.1)-5-heptene-2-(alpha,beta-dichloropropionic acid) melting at 192–4° C.

*Analyses.*—Found, 26.9% C, 64.2% Cl; calculated, 27.2% C, 64.4% Cl.

EXAMPLE XIII.—1, 4, 5, 6 - TETRACHLOROBICY-CLO(2.2.1)-5-HEPTENE-ENDO - 2 - CARBOXYLIC ACID

Forty-one grams of 1,2,3,4-tetrachloro-1,3-cyclopentadiene and 14.5 grams of acrylic acid stabilized with methylene blue were mixed, 20 ml. of a 1:1 mixture of diethyl ether and benzene was added, and the mixture was allowed to stand at room temperature over the weekend. The solid product which had separated from the reaction mixture was crystallized from nitromethane to yield 1,4,5,6-tetrachlorobicyclo(2.2.1)-5-heptene-endo - 2 - carboxylic acid, melting point 138–40° C.

EXAMPLE XIV.—POTASSIUM 1, 4, 5, 6, 7, 7-HEXA-CHLOROBICYCLO(2.2.1) - 5 - HEPTENE - 2 - CAR-BOXYLATE

To an approximately 7.0% w. aqueous solution of potassium hydroxide there was added the equivalent amount of 1,4,5,6,7,7-hexachlorobicyclo(2.2.1)-5-heptene-2-carboxylic acid and the mixture was warmed on the steambath for one hour. The resulting aqueous solution was partially evaporated and cooled to yield 119 grams of crystalline potassium 1,4,5,6,7,7-hexachlorobicyclo-(2.2.1)-5-heptene-2-carboxylate. The salt was found to contain 10.2% potassium compared to the theoretical content of 10.2%.

EXAMPLE XV.—ZINC 1,4,5,6,7,7 - HEXACHLORO-BICYCLO(2.2.1)-5-HEPTENE-2-CARBOXYLATE 103.5 grams of 1,4,5,6,7,7-hexachlorobicyclo(2.2.1)-5-heptene-2-carboxylic acid was added to a solution of 12 grams of sodium hydroxide in 300 ml. of water and the resulting mixture was warmed on the steambath with addition of enough water to effect complete solution. To the resulting solution there was added a solution of 20.5 grams of zinc chloride in water. The zinc 1,4,5,6,7,7-hexachlorobicyclo(2.2.1)-5-heptene-2-carboxylate precipitated immediately. There was removed by filtration and washed with hot water to give 110 grams of product containing 8.9% zinc compared to the theoretical content of 8.7%.

EXAMPLE XVI. — ETHANOLAMINE SALT OF 1,4,5,6,7,7 - HEXACHLOROBICYCLO - (2.2.1) - 5 - HEPTENE-2-CARBOXYLIC ACID

There were mixed equimolar amounts of 1,4,5,6,7,7-hexachlorobicyclo(2.2.1)-5-heptene-2-carboxylic acid and ethanolamine. A mildly exothermic reaction resulted. The product then was washed with hexane followed by ether, and dried. The salt melted at 143–4° C. It was soluble in water, acetone and methanol. It was insoluble in hexane, ether and benzene.

*Analyses.*—Found, 52.5% Cl, neutralization equivalent 400; calculated, 52.5% Cl, neutralization equivalent 406.

EXAMPLE XVII.—AMMONIUM 1,4,5,6,7,7 - HEXA-CHLOROBICYCLO(2.2.1) - 5-HEPTENE - 2 - CAR-BOXYLATE

Solid 1,4,5,6,7,7-hexachlorobicyclo(2.2.1)-5-heptene-2-carboxylic acid was triturated with an excess of 1 N aqueous ammonium hydroxide solution while warming on the steambath. The resulting solid salt was removed by filtration and washed twice with hot benzene. The salt was moderately soluble in water and in acetone and isopropyl alcohol. It was insoluble in benzene, hexane and ether.

EXAMPLE XVIII. — SODIUM 1,4,5,6,7,7 - HEXA-CHLOROBICYCLO(2.2.1)-5-HEPTENE - 2 - CAR-BOXYLATE

A quantity of 1,4,5,6,7,7-hexachlorobicyclo(2.2.1)-5-heptene-2-carboxylic acid was dissolved in the equivalent amount of warm 2.5% w. aqueous sodium hydroxide solution and the resulting clear solution was cooled to about 15° C. to precipitate the salt. The precipitated sodium 1,4,5,6,7,7-hexachlorobicyclo(2.2.1) - 5 - heptene - 2 - carboxylate was filtered off, washed once with cold water and twice with hot benzene and then dried. The salt was soluble in acetone, ether and isopropyl alcohol. The solubility of the sodium 1,4,5,6,7,7-hexachlorobicyclo-(2.2.1)-5-heptene-2-carboxylate in water was approximately 111 grams per liter of water at 17° C.

EXAMPLE XIX.—HYDRAZINE SALT OF 1,4,5,6,7,7-HEXACHLOROBICYCLO(2.2.1) - 5 - HEPTENE - 2-CARBOXYLIC ACID

To a solution of 1,4,5,6,7,7-hexachlorobicyclo(2.2.1)-5-heptene-2-carboxylic acid in an equal weight of diisopropyl ether there was added an equimolar amount, based upon the acid, of hydrazine hydrate. By cooling of the resulting solution the hydrazine salt was crystallized out. The salt was recrystallized from a mixture of methanol and chloroform and the recrystallized product was washed with ethyl ether and dried to yield the purified product, melting point 173–6° C. The salt was found to contain 56.2% chlorine and to have a neutralization equivalent of 373, compared to the calculated chlorine content of 56.5% and calculated neutralization equivalent of 377.

As shown in certain of the examples, the novel acids of this invention conveniently can be prepared by direct reaction between a polyhalogeno-substituted conjugated cyclopentadiene hydrocarbon and carboxylic acids having in a linear carbon chain that is directly bonded to the carboxyl group, one or more pairs of carbon atoms that are connected together by an unsaturated linkage.

When this direct method of synthesis is employed, the polyhalogeno-substituted conjugated cyclopentadiene hydrocarbon adds by a 1,4-addition reaction to a pair of carbon atoms that are interconnected by an unsaturated linkage to generate the polyhalogeno-substituted bicycloheptenyl or bicycloheptadienyl substituent that characterizes the novel acids of the invention. Where the unsaturated carboxylic acid reactant contains but one pair of unsaturated carbon atoms in the chain, there will be generated only a single polyhalogeno-substituted bicyclic substituent group. If the unsaturation is of the ethylenic type, the polyhalogeno-substituted bicyclic group will be a polyhalogeno-substituted bicycloheptenyl group having halogen substituted on carbon of the unsaturated pentatomic ring. Where the unsaturation is of the acetylenic type, the polyhalogeno-substituted bicyclic group will be a polyhalogeno-substituted bicycloheptadienyl group having halogen substituted on carbon of the unsaturated pentatomic ring that is derived from the cyclopentadienoic reactant.

Where the unsaturated carboxylic acid reactant contains two or more pairs of carbon atoms that are bonded together by unsaturated linkages, its reaction with the polyhalogeno-substituted conjugated cyclopentadiene hydrocarbon may lead to combination of the two reactants in 1:1 mole ratio, or by using an excess of the poly-halogeno-substituted cyclopentadiene hydrocarbon two or more moles may be caused to combine with the unsaturated carboxylic acid according to the number of pairs of unsaturated carbon atoms contained in the latter. It thus will be understood that the invention includes the novel substituted acids of the fatty acid series wherein there may be substituted directly on carbon thereof a plurality of halogen-substituted bicyclo(2.2.1)-5-heptenyl or halogen-substituted bicyclo(2.2.1)-2,5-heptadienyl radicals as well as those novel acids wherein there is present but a single halogen-substituted bicyclo(2.2.1)-5-heptenyl or bicyclo(2.2.1)-2,5-heptadienyl radical.

With regard to one of the more limited aspects of the invention, the reaction which takes place during such direct synthesis of novel products of the invention can be described by the chemical equation

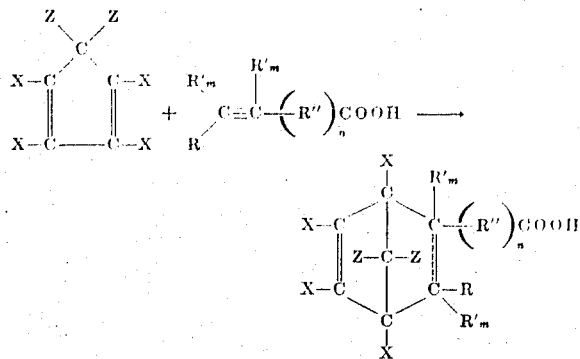

In this equation each X represents an atom of halogen and each Z represents one of the class consisting of hydrogen and the halogens, each R and R' represent one of the class consisting of hydrogen and the hydrocarbon groups while R" represents a divalent aliphatic radical, the letter $n$ represents the numeral 0 or 1 and each $m$ represents 0 or 1 with the proviso that both $m$'s have the same value. When both $m$'s equal 1 the carbons to which the groups R' are bonded are interconnected by a saturated bond; when m represents 0, these carbon atoms are interconnected by an ethylene bond.

The polyhalogeno conjugated cyclopentadiene hydrocarbons which are employed for preparing the novel acids of this invention may have two, three, four, five or six halogen substituents, the preferred products being obtained from the polyhalogeno-substituted conjugated cyclopentadiene hydrocarbons which have from four to six halogen substituents.

The polyhalogeno-substituted cyclopentadiene hydrocarbons that are employed are composed solely of atoms of carbon, hydrogen and halogen. If they contain less than six atoms of halogen substituted on the unsaturated ring, they may contain one or more hydrocarbon substituents, such as one or more lower alkyl group, e. g. methyl or ethyl, substituted on the ring. Representative polyhalogeno-substituted conjugated cyclopentadiene hydrocarbons that can be employed include, for example, hexachloro-1,3-cyclopentadiene, hexabromo-1,3-cyclopentadiene, tetrachlorodibromo-1,3-cyclopentadiene, tetrabromo-1,3-cyclopentadiene, 1,2,3,4,5-pentachloro-1,3-cyclopentadiene, 1,2,3,4-tetrachloro-1,3-cyclopentadiene, 1,2,3,4-tetrabromo-1,3-cyclopentadiene, 1,5-dichloro-1,3-cyclopentadiene, 1,2,3-trichloro-1,3-cyclopentadiene, 1,5-dibromo-1,3-cyclopentadiene, 1,2-dibromo-3,4-dichloro-1,3-cyclopentadiene, 5-methylpentachloro-1,3-cyclopentadiene, 1-methyl-2,3,4,5,5-pentachloro-1,3-cyclopentadiene, 2-methyl-1,3,4,5,5-pentachloro-1,3-cyclopentadiene, and 1-ethyl-2,3,4,5,5-pentachloro-1,3-cyclopentadiene. The preferred polyhalogeno-substituted conjugated cyclopentadiene hydrocarbons are those in which the halogens are restricted to the middle halogens, that is to say, bromine and/or chlorine, the chloro compounds being especially preferred. For the preparation of the particularly preferred products there are employed the pentatomic halogen-substituted conjugated cyclopentadiene hydrocarbons having from four to six chlorine atoms as the only halogen substituents.

It is not necessary that the unsaturated carboxylic acid reactant contain carbon-to-carbon unsaturation in conjugate relation to the carboxyl group. This fact is illustrated by Examples III and VI, although Example I shows that conjugated unsaturated carboxylic acids may also be employed. The unsaturated linkage of the carboxylic acid reactant may be terminal, as is illustrated by Examples III and VI, or it may be at an intermediate position in the aliphatic chain, as is illustrated by Example VIII.

There may be substituents on one or both of the atoms of the pair of unsaturated carbon atoms in question. Where such substituents are present, they will appear in the product as ring substituents either vicinal or geminate, as the case may be, to the substituted fatty acid residue. For instance, Example VIII shows that use of crotonic acid, wherein there is a methyl substituent on the beta carbon atom, results in the formation of a product of this invention having a methyl substituent on the halogen-substituted bicycloheptenyl substituent group. With cinnamic acid, there is formed a polyhalo bicycloheptenyl-substituted acid of the fatty acid series having a phenyl substituent on the bicycloheptenyl ring, e. g. 1,4,5,6,7,7-tetrachloro-3-phenylbicyclo(2.2.1)-5-heptene-2-carboxylic acid. With alpha-cyclopentylacrylic acid as the unsaturated acid, there is formed a substituted acid of the fatty acid series wherein the polyhalogeno bicycloheptenyl group has a cycloaliphatic substituent on the ring, e. g. 1,4,5,6,7,7-hexachloro-2-cyclopentyl-2-carboxylic acid. Novel products of the invention containing an alkyl substituent on the bicycloheptenyl or bicycloheptadienyl nucleus may also be prepared by employing an alkyl-substituted polyhalogeno conjugated cyclopentadiene hydrocarbon, for example, 4,5,6,7,7-pentachloro-1-methyl-bicyclo(2.2.1)-5-heptene-2-carboxylic acid that is obtained by reaction of 1-methyl-2,3,4,5,5-pentachloro-1,3-cyclopentadiene with acrylic acid.

Unsaturated acids containing but a single unsaturated carbon-to-carbon linkage, that being of the ethylenic type, include, among others, acrylic acid, methacrylic acid, crotonic acid, alpha-ethyl-acrylic acid, alpha-ethyl-beta-isopropylacrylic acid, 3-butenoic acid (vinylacetic acid), 4-pentenoic acid, 5-hexenoic acid, 6-heptenoic acid, 7-octenoic acid, pyroterebic acid, teracrylic acid, 2-decenoic acid, 10-undecenoic acid, 2-dodecenoic acid, oleic acid, elaidic acid, isooleic acid, erucic acid, petroselinic acid, cetoleic acid, and their higher homologs containing as many as 32 carbon atoms as well as their various branched-chain analogs. Acetylenically unsaturated carboxylic acids which may be employed for preparing the novel substituted acids of the fatty acid series according to the invention include propiolic acid, tetrolic acid, ethylacetylenecarboxylic acid, amylpropiolic acid, undecalic acid, sterolic acid, behenolic acid, and their various homologs and analogs.

Representative poly-unsaturated carboxylic acids which may be employed for synthesizing novel substituted fatty acids of this invention include, among others, vinylacrylic acid, sorbic acid, geranic acid, linoleic acid, ricinoleic acid, elaeostearic acid, linolenic acid, and clupanodic acid. For preparing a preferred group of the novel substituted acids of this invention, wherein the substituted fatty acid is a substituted $C_1$ to $C_4$ fatty acid, there are employed the $C_3$ to $C_6$ unsaturated carboxylic acids wherein the carboxyl group either is attached directly to an ethylenic or acetylenic carbon or is separated therefrom by not more than two intervening saturated carbon atoms.

Novel substituted acids of the fatty acid series which can be prepared from such polyhalogeno-substituted conjugated cyclopentadiene hydrocarbons and unsaturated carboxylic acids having ethylenic and/or acetylenic unsaturation in a carbon chain to which the carboxyl group is bonded include, in addition to those described in the examples, the following: 1,4,5,6,7,7-hexachlorobicyclo-(2.2.1)-5-heptene-2-butyric acid, 1,4,5,6,7,7-hexachlorobicyclo(2.2.1)-5-heptene-2-isobutyric acids, 1,4,5,6,7,7-hexachlorobicyclo(2.2.1)-5-heptene-2-pentanoic acid, 1,4,5,6,7,7-hexachlorobicyclo(2.2.1)-5-heptene-2-hexanoic acid, 1,4,5,6,7,7 - hexachlorobicyclo(2.2.1)-5-heptene - 2 - heptanoic acid, 1,4,5,6,7,7 - hexachlorobicyclo(2.2.1) - 5 - heptene-2-caprylic acid, 1,4,5,6,7,7-hexachlorobicyclo(2.2.1)-5-heptene-2-capric acid, 1,4,5,6,7,7-hexachlorobicyclo(2.2.1)-5-heptene - 2 - myristic acid, 1,4,5,6,7,7 - hexachlorobicyclo-(2.2.1)-5-heptene-2-palmitic acid, 1,4,5,6,7,7-hexachlorobicyclo(2.2.1)-5-heptene-2-melissic acid, 1,4,5,6,7,7-hexachlorobicyclo(2.2.1)-5-heptene-2-arachidic acid, 1,4,5,6,7,7-hexachlorobicyclo(2.2.1)-5-heptene-2-alpha-ethylcaproic acid, 1,4,5,6,7,7-hexachlorobicyclo(2.2.1)-5-heptene-2-beta, beta-dimethylbutyric acid, 1,4,5,6,7,7-hexachlorobicyclo-(2.2.1)-5-heptene-2-alpha-isopropylpropionic acid, 1,4,5, 6,7,7 - hexabromobicyclo(2.2.1)-5-heptene - 2 - acetic acid, 1,4,5,6,7,7 - hexabromobicyclo(2.2.1)-5-heptene-2-carboxylic acid, 1,4,5,6,7,7-hexabromobicyclo(2.2.1)-5-heptene-2-propionic acid, 1,4,5,6,7,7-hexabromobicyclo(2.2.1)-5-heptene-2-pelargonic acid, 1,4,5,6,7,7-hexabromobicyclo-(2.2.1)-5-heptene-2-palmitic acid, 1,4,5,6-tetrachloro-7,7-dibromobicyclo(2.2.1)-5-heptene-2-acetic acid, 4,5,6,7,7-pentachloro - 1 - methylbicyclo(2.2.1)-5-heptene - 2 - acetic acid, 1,4,5,6,7,7 - hexachloro-3-phenyl - 2 - methylbicyclo-(2.2.1)-5-heptene-2-acetic acid, 1,4,5,6,7,7-hexachlorobicyclo(2.2.1)-5-heptene-2-alpha-cyclopentylpropionic acid, 1,4,5,6,7,7-hexachlorobicyclo(2.2.1)-5-heptene - 2 - methacrylic acid, 1,4,5,6,7,7-hexachlorobicyclo(2.2.1)-5-heptene-2-crotonic acid, 1,4,5,6,7,7-hexachloro-3-heptylbicyclo-(2.2.1)-5-heptene-2-heptoic acid, 1,4,5,6,7,7-hexachloro-3-octylbicyclo(2.2.1)-5-heptene-2-heptoic acid, 1,4,5,6,7,7-hexabromo-3-phenylbicyclo(2.2.1)-5-heptene - 2 - carboxylic acid, 1,4-dichlorobicyclo(2.2.1)-5-heptene - 2 - acetic acid, 5,6-dibromobicyclo(2.2.1)-5-heptene-2-formic acid, 1,4,5,6,7,7 - hexachloro - 3 - (3 - heptenyl)bicyclo(2.2.1)-5-heptene-2-caprylic acid, 1,4,5,6,7,7-hexachloro-3-propylbicyclo(2.2.1)-5-heptene-2-(3-dodecenoic acid), 1,4,5,6, 7,7-hexachlorobicyclo(2.2.1)-2,5-heptadiene-2-acetic acid, 1,4,5,6,7,7 - hexachlorobicyclo(2.2.1) - 2,5 - heptadiene-2-propionic acid, 1,4,5,6,7,7-hexachlorobicyclo(2.2.1)-2,5-heptadiene-2-butyric acid and 1,4,5,6,7,7-hexachloro-3-ethylbicyclo(2.2.1)-2,5-heptadiene-2-carboxylic acid.

In accordance with the invention, the reaction between the polyhalogeno-substituted conjugated cyclopentadiene hydrocarbon and the unsaturated acid reactant is brought about by heating the two materials together at an elevated temperature for a time sufficient to produce appreciable amounts of the desired product. The reaction can be caused to occur by mixing the selected reactants and heating the mixture at temperatures within the range of from about 50° to about 200° C. for lengths of time that will depend both upon the reaction temperature and upon the particular reactants that are involved. In general, reaction times between about 3 hours and 36 hours are used although these figures are not intended to be limiting. The two reactants preferably are employed in about the theoretical proportions, the use of an excess of either reactant in most cases tending only to reduce the conversion efficiency based upon the amount of that reactant charged. As a general rule, it is preferred that neither reactant be present in more than about a 50% excess over the amount theoretically required to react with the other reactant. Where readily polymerizable reactants are employed, such as acrylic acid, methacrylic acid, propiolic acid, and the like, it is desirable to include a small amount of a polymerization inhibitor, such as hydroquinone, in the reaction mixture. The polymerization inhibitor, although without observed effect upon the desired reaction does tend to increase the yield of desired product by cutting down the amount of undesired resinous by-products that may be formed.

The reaction may be conducted with or without dilution of the reaction mixture with an inert solvent. In fact, it generally is desirable to conduct the reaction with the reactants present in undiluted form. In some cases, however, it may be desired to promote or provide homogeneity of the reaction mixture or to facilitate control of the reaction mixture by including an inert volatile organic solvent in the reaction mixture. Solvents which can be employed for such purposes include aromatic hydrocarbons, for example, benzene, toluene, xylene, etc., as well as aliphatic hydrocarbons, such as $C_6$ to $C_{12}$ paraffins and the like.

The working examples show that various methods can be used for recovering the desired products from the reaction mixtures. Thus, where the product is distillable it may be recovered by fractional distillation using conventional fractionating equipment or, if desired, with the aid of a molecular still. Extraction with organic solvents and crystallization therefrom, extraction with aqueous alkali and springing by acidification to precipitate the desired acid, extraction of either the crude products or solutions of the same using selective solvent, sublimation and fractional crystallization all are methods that may be applied for recovering and purifying the products of the invention.

Although in many cases it is convenient to synthesize the desired substituted acid directly by reaction of a polyhalogeno-substituted conjugated cyclopentadiene hydrocarbon and an ethylenically or acetylenically unsaturated hydrocarboxylic acid, in other cases it may be desired or more convenient first to prepare a derivative of the desired substituted acid of the fatty acid series and to convert this derivative to the desired substituted acid. This modified procedure for preparing the products of the invention has been illustrated in certain of the working examples, namely, in Example VII, where the acid was prepared from the nitrile, and in Examples II and V, where the derivative was an ester derivative.

In this modified procedure for preparing the substituted acids of the invention there desirably is employed a nitrile, an amide, ester, acid halide or other hydrolyzable, or anhydro, derivative corresponding to the unsaturated carboxylic acid reactants described hereinbefore. The polyhalogeno-substituted conjugated cyclopentadiene hydrocarbon reactant and the anhydro derivative of the unsaturated carboxylic acid are caused to form the corresponding anhydro derivative of the desired substituted acid of the fatty acid series by reaction with each other under conditions the same as or comparable to those employed when the unsaturated acid as such is employed. The resulting nitrile, amide, ester, acid halide or other anhydro derivative, as the case may be, corresponding to the desired substituted acid of the fatty acid series then may be hydrolyzed, as by treatment with an aqueous solution of a mineral acid, or saponified with alkali, in order to obtain the desired ultimate product.

A third method, that is applicable to the preparation of certain of the novel acids of the invention, is to prepare first a 1:1 Diels-Alder adduct of the selected polyhalogeno-substituted conjugated cyclopentadiene hydrocarbon and an alpha-beta-ethylenically unsaturated aldehyde, such as acrolein, methacrolein, crotonaldehyde, or the like. These adducts, or formyl-substituted polyhalogeno bicycloheptenes, can be oxidized as by treatment with chromic acid, potassium permanganate or molecular oxygen with the aid of catalysts, to yield the corresponding polyhalogeno-substituted bicyclo(2.2.1)-5-heptene-2-carboxylic acids or they may be employed as intermediates for the preparation of novel substituted unsaturated acids of the fatty acid series by condensation with malonic acid, frequently referred to as the Doebner modification of the Knoevenagel condensation. The preparation of 1,4,5,6,7,7-hexachlorobicyclo(2.2.1)-5-heptene-2-acrylic acid by this modified procedure has been illustrated in Example IX of the application. These and the analogous substituted unsaturated acids of the fatty acid series, regardless of the particular method used for their preparation, may be converted to the corresponding substituted saturated acids by hydrogenation or by addition of other agents which will saturate the exocyclic unsaturated linkage or linkages, for example, by halogenation, to yield corresponding bromo-, chloro-, iodo- or fluoro-substituted saturated acids.

Adducts which can be employed in accordance with this method of the invention are themselves new compounds and are more fully described and are claimed in the copending application of S. B. Soloway, Serial No. 494,276, filed of even date herewith, now Patent No. 2,761,879, the disclosures of said copending application being hereby incorporated by reference.

As is shown by the working examples, the novel salts of this invention can be prepared by direct neutralization of the corresponding substituted acid with the appropriate metal hydroxide or nitrogen base. As also is shown by the working examples, they can be prepared in certain cases by saponification of a readily hydrolyzable derivative of the acid by treatment with alkali.

The salts which are included by the invention are the salts of the hydroxide-forming metals, including particularly the alkalinous metals, by which term reference is made to the alkali metals and alkaline earth metals, and the salts of the amphoteric elements. Specific metal salts include, without being limited to, the lithium, sodium, potassium, cesium, rhubidium, magnesium, calcium, strontium, barium, aluminum, zinc, iron, copper, nickel, and cobalt salts. The salts of the invention also include the salts with nitrogen bases, which term is inclusive of ammonia, hydrazine, primary amines, secondary amines, tertiary amines and quaternary amines. The amine may be aliphatic, e. g. ethylamine, methylamine, diallylamine, triethylamine, ethanolamine, ethylene diamine, hexamethylene diamine, diacetonediamine, or tetramethylammonium hydroxide; carbocyclic, e. g. aniline, dimethylaniline, cyclohexylamine, dicyclohexylamine, or diphenylamine; or heterocyclic, e. g. pyridine, piperidine, pyrimidine, tetramethylpyrimidine, 2-heptadecyl-4,4,6-trimethyltetrahydropyrimidine or morpholine.

The term "acid of the fatty acid series" is used in the present specification and claims to refer to the carboxylic acids of aliphatic or open-chain structure. The term thus refers to monobasic carboxylic acids derived from open-chain hydrocarbons by the equivalent of oxidation of a methyl group. It includes the saturated acids of the acetic series, both normal and branched chain, $C_nH_{2n+1}COOH$, for example, formic acid, propionic acid, isovaleric acid and stearic acid, and related unsaturated acids, for example, acrylic acid, propiolic acid, oleic acid, and ricinoleic acid.

It will be understood that it is intended to claim broadly the novel aspects of the present invention and that the invention includes numerous specific embodiments which are illustrated rather than limited by the examples presented in the accompanying specification.

I claim as my invention:

1. A chemical compound of the class consisting of (a) the acids having the structure represented by the chemical formula

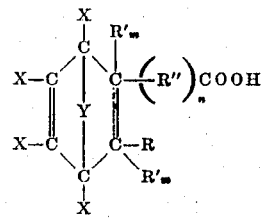

in which each X represents an atom of a halogen, Y represents one of the class consisting of the alkylidene and halogen-substituted alkylidene groups, each R and R' represent one of the class consisting of hydrogen and the hydrocarbon groups, R" represents an aliphatic radical, one valency of which is satisfied by attachment to the depicted halogeno-substituted polycyclic group and another valency of which is satisfied by attachment to the depicted carboxyl group, n and m each represents a number selected from the group consisting of 0 and 1 with the proviso that both m's have the same value, and (b) the salts of the said acids.

2. A substituted acid of the fatty acid series having substituted directly on carbon thereof a 1,4,5,6,7,7-hexahalogenobicyclo(2.2.1)-5-hepten-2-yl radical.

3. A substituted acid of the fatty acid series having substituted directly on carbon thereof a 1,4,5,6-tetrahalogenobicyclo(2.2.1)-5-hepten-2-yl radical.

4. 1,4,5,6,7,7 - hexachlorobicyclo(2.2.1) - 5 - heptene-2-acrylic acid.

5. 1,4,5,6,7,7 - hexachlorobicyclo(2.2.1) - 5 - heptene-2-acetic acid.

6. 1,4,5,6 - tetrachlorobicyclo(2.2.1) - 5 - heptene - 2-carboxylic acid.

7. A salt of (a) a substituted aliphatic acid having substituted directly on carbon thereof a halogen-substituted bicyclo(2.2.1)-5-hepten-2-yl radical composed solely of atoms of carbon, hydrogen and halogen and containing a plurality of atoms of halogen substituted on carbon of the unsaturated pentatomic ring, and (b) a material of the group consisting of nitrogen bases and hydroxide-forming metals.

8. A salt of (a) a substituted acid of the fatty acid series having substituted directly on carbon thereof a 1,4,5,6,7,7 - hexachlorobicyclo(2.2.1) - 5 - hepten - 2 - yl group and (b) a hydroxide-forming metal.

References Cited in the file of this patent

UNITED STATES PATENTS

| | | |
|---|---|---|
| 2,552,567 | McBee et al. | May 15, 1951 |
| 2,688,021 | Jenkins | Aug. 31, 1954 |
| 2,758,918 | Soloway et al. | Aug. 14, 1956 |

OTHER REFERENCES

Prill: J. A. C. S. 69, pp. 62–63 (1947).